US011809806B2

(12) United States Patent
Jain et al.

(10) Patent No.: US 11,809,806 B2
(45) Date of Patent: Nov. 7, 2023

(54) GLYPH ACCESSIBILITY SYSTEM

(71) Applicant: Adobe Inc., San Jose, CA (US)

(72) Inventors: Arushi Jain, Ashok Vihar (IN); Ashish Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 331 days.

(21) Appl. No.: 17/368,419

(22) Filed: Jul. 6, 2021

(65) Prior Publication Data

US 2023/0008785 A1    Jan. 12, 2023

(51) Int. Cl.
| | |
|---|---|
| *G06F 40/109* | (2020.01) |
| *G06T 11/20* | (2006.01) |
| *G06F 16/908* | (2019.01) |
| *G06F 16/903* | (2019.01) |
| *G06F 18/22* | (2023.01) |

(52) U.S. Cl.
CPC .......... *G06F 40/109* (2020.01); *G06F 16/908* (2019.01); *G06F 16/90335* (2019.01); *G06F 18/22* (2023.01); *G06T 11/203* (2013.01)

(58) Field of Classification Search
None
See application file for complete search history.

(56) References Cited

U.S. PATENT DOCUMENTS

| | | | |
|---|---|---|---|
| 4,680,710 A | 7/1987 | Kizilbash | |
| 7,702,182 B2 | 4/2010 | Nolan et al. | |
| 10,636,387 B2 | 4/2020 | Imms | |
| 2004/0088657 A1 | 5/2004 | Brown et al. | |
| 2004/0189666 A1 | 9/2004 | Frisken et al. | |
| 2008/0079730 A1 | 4/2008 | Zhang et al. | |
| 2010/0275161 A1* | 10/2010 | DiCamillo | G06F 40/103 715/810 |
| 2013/0027406 A1 | 1/2013 | Liu et al. | |
| 2013/0151957 A1 | 6/2013 | Kuroiwa | |
| 2014/0164352 A1* | 6/2014 | Denninghoff | H03H 9/02622 707/711 |
| 2014/0195903 A1* | 7/2014 | Kaasila | G06F 40/109 715/269 |
| 2015/0332491 A1 | 11/2015 | Dwivedi et al. | |
| 2017/0322913 A1* | 11/2017 | Kukreja | G06F 3/0236 |
| 2017/0323007 A1* | 11/2017 | Kukreja | G06F 16/58 |
| 2019/0050559 A1* | 2/2019 | McCarty | H04L 63/1483 |
| 2019/0243875 A1 | 8/2019 | Jain et al. | |
| 2020/0066016 A1 | 2/2020 | Wang | |
| 2021/0019366 A1 | 1/2021 | Markey et al. | |

(Continued)

OTHER PUBLICATIONS

GLYPHS file extension; file-extensions.org, Aug. 11, 2020, pp. 1-2.

(Continued)

*Primary Examiner* — Jeffrey J Chow
(74) *Attorney, Agent, or Firm* — FIG. 1 Patents

(57) ABSTRACT

Glyph accessibility techniques are described as implemented by a digital content processing system involving accessing glyphs and glyph alternatives. These techniques include preprocessing techniques in which a base font is used to determine similarity of glyphs within the base font to each other. Glyph metadata that describes this similarity is cached in a storage device and used during runtime to increase efficiency in locating similar glyphs in other fonts.

20 Claims, 12 Drawing Sheets

(56) References Cited

U.S. PATENT DOCUMENTS

2021/0224465 A1    7/2021   Dhanuka et al.
2022/0253871 A1    8/2022   Miller

OTHER PUBLICATIONS

"MergeGlyphs", glyphsapp.com, Nov. 20, 2020, pp. 1-5.
U.S. Appl. No. 17/984,656, filed Aug. 23, 2023, "Final Office Action", U.S. Appl. No. 17/984,656, filed Aug. 23, 2023, 21 pages.
U.S. Appl. No. 17/984,656, filed Jun. 6, 2023, "Non-Final Office Action", U.S. Appl. No. 17/984,656, filed Jun. 6, 2023, 17 pages.
Jain, Ashish, et al., "US Application as Filed", U.S. Appl. No. 17/984,656, filed Nov. 10, 2022, 51 pages.

\* cited by examiner

Fig. 11

GLYPH ACCESSIBILITY SYSTEM

BACKGROUND

Digital content creation systems continue to expand the ways in which text and other characters are expressed as part of digital content. A digital content creation system, for instance, typically supports a variety of different scripts, e.g., Latin, Roman, Greek, and so forth. Each of these scripts includes hundreds and even thousands of different fonts. Fonts are arrangeable in font families referred to as "typefaces" to support variations, such as extra bold, bold, regular, italics, and so forth. Glyphs are used as part of the font to represent individual characters, letters, numbers, punctuation, and other symbols. Fonts typically include hundreds and even thousands of different glyphs.

Font formats have also continued to expand to increase availability of glyph alternatives. For example, OpenType fonts support alternatives for potentially thousands of different glyphs. Glyph alternatives are combinable with standard characters of a font in order to increase readability, comply with a desired level of formality, and/or create a typographic personality for different instances of digital content, e.g., digital documents, webpages, and so forth. A content creator, for instance, accesses a digital content creation system to specify combinations of alternative characters as substitutes for default characters in order to create a natural and less repetitive flow in text expressed in a digital content, such as for instances that mimic handwriting, calligraphy, and so on.

Although availability of alternative glyphs continues to increase due to an extended character set made available by font formats such as OpenType, techniques used to support ease of accessibility to these alternative glyphs have not. This is due to a lack in uniformity in how glyphs and alternative glyphs are categorized within a font, because fonts are built and organized depending on the whims of a font designer.

Fonts, for instance, can vary in how glyphs are organized across subcategories. Examples of subcategories include contextual, stylistic, titling alternatives, discretionary ligatures, swash characters, small caps, as well as ornaments, flourishes, symbols, punctuation, accented characters, alternatives for numerals, and so forth. Additionally, consistency even in these subcategories differs and therefore access across different types of fonts also differs as this is left to a font designer to interpret how these different subcategories correspond to different glyphs. Accordingly, user access to these alternatives is inefficient and complicated when confronted with thousands of potential glyphs even for a single font, not readily performable by a human being due to the complexity and variance between types of fonts, and results in inefficient use of computational resources of computing device that implement these conventional techniques in order to support repeated access to the glyph alternatives.

SUMMARY

Glyph accessibility techniques are described as implemented by a digital content processing system to improve user efficiency and computational resource consumption in accessing glyphs and glyph alternatives. These techniques include preprocessing techniques in which a base font is used to determine similarity of glyphs within the base font to each other. Glyph metadata that describes this similarity is cached in a storage device and used during runtime to increase efficiency in locating similar glyphs in other fonts. As a result, computational efficiency of computing devices that leverage these techniques is improved along with corresponding increases in user interaction efficiency in accessing alternative glyphs even for fonts that have not been previously encountered by the digital content processing system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 11 depicts an example of glyphs and alternative glyphs for a font.

DETAILED DESCRIPTION

Overview

Figure 1:
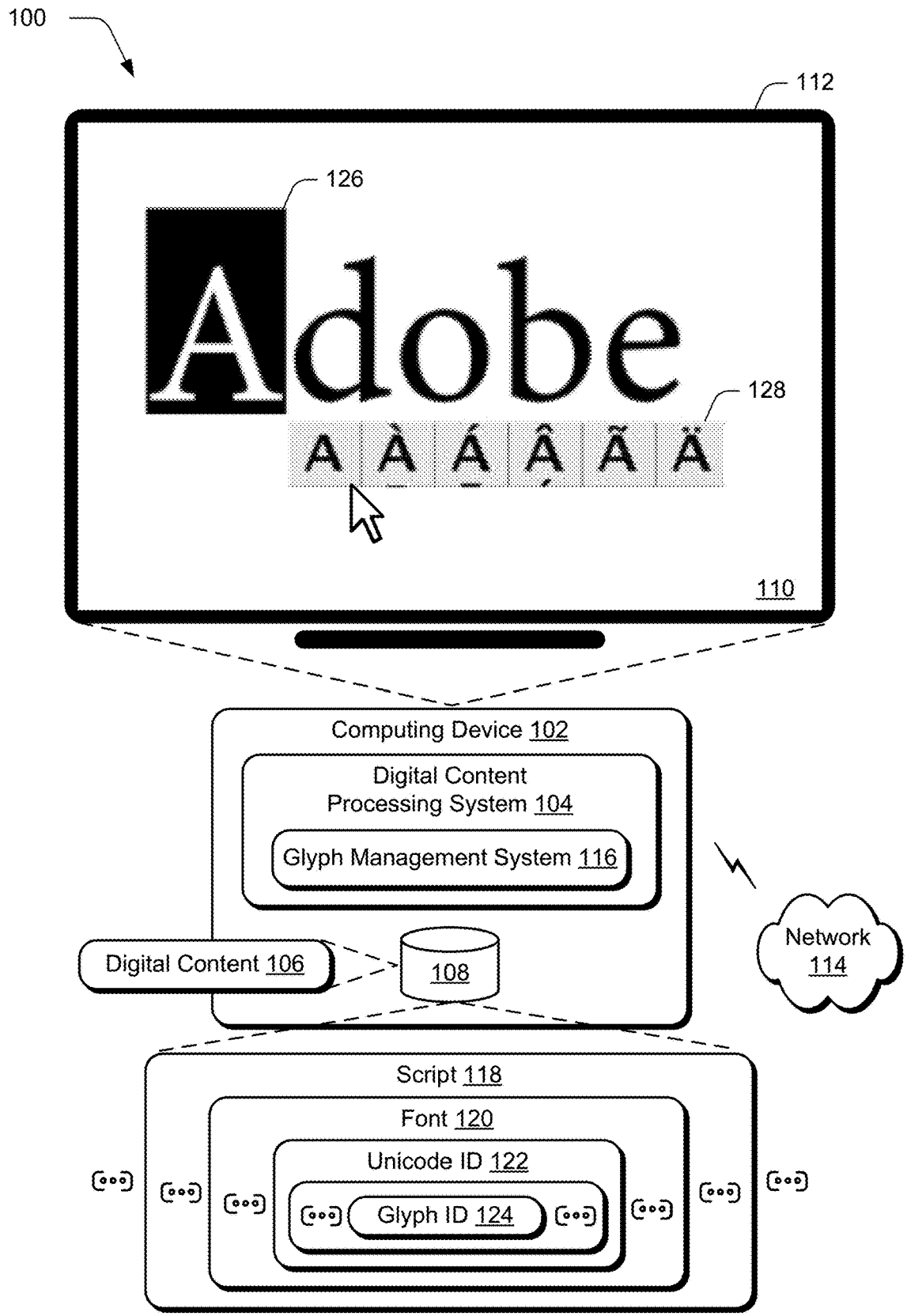
FIG. 1 is an illustration of an environment in an example implementation that is operable to employ glyph accessibility techniques described herein.

Extended character sets made available by font formats such as OpenType have increased availability of alternative glyphs in corresponding fonts such that even a single font may include thousands of alternatives. However, conventional techniques used to access these alternative glyphs are cumbersome. This is due to a lack in uniformity in how glyphs and alternative glyphs are categorized within a font because fonts are built and organized by a corresponding font designer and are not standardized. As such, access to the potentially thousands of alternative glyphs included as part of a single font is difficult to achieve manually by a user through interaction with digital content processing systems that support these font formats.

Accordingly, glyph accessibility techniques are described as implemented by a digital content processing system to improve user efficiency and computational resource consumption in accessing glyphs and glyph alternatives. These techniques include preprocessing techniques in which a base font is used to determine similarity of glyphs within the base font to each other. Glyph metadata that describes this similarity is cached in a storage device and used during runtime to increase efficiency in locating similar glyphs in other fonts. As a result, computational efficiency of computing devices that leverage these techniques is improved along with corresponding increases in user interaction efficiency in accessing alternative glyphs even for fonts that have not been previously encountered by the digital content processing system.

To do so in one example, a glyph management system receives an input selecting a script, e.g., Latin, Greek, etc. In response, a plurality of fonts is obtained that correspond to the selected script. From this, a base font is chosen from the plurality of fonts by the system. This is performable in a variety of ways, such to select the base font based on a number of distinct Unicode identifiers in order to maximize the number of Unicode identifiers that are to be used for preprocessing.

Glyph clusters are then formed from glyphs included in the base font. To begin, the glyph management system initiates generation of initial (i.e., candidate) glyph clusters for distinct Unicode identifiers included in the base font. Alternatives of those glyphs that have the same Unicode identifiers (e.g., but different glyph identifiers) are also assigned to corresponding initial glyph clusters. A representative glyph is then generated for each of the candidate glyph clusters, e.g., as an average of glyphs assigned to respective glyph clusters for those clusters that are assigned more than one glyph.

The glyph management system then combines clusters based on similarity of the representative glyphs to each other, e.g., as exhibiting at least a threshold amount of similarity to each other. This process iterates to combine and recombine glyph clusters and corresponding generation and regeneration of the representative glyphs until a final collection of glyph clusters is formed that are assigned glyphs that have at least a threshold amounts of similarity to each other. A result of this is used to generate glyph metadata describing the glyph clusters that includes the Unicode identifiers of respective glyphs from the base font assigned to the clusters. The glyph metadata is cached in a storage device for use at runtime by the glyph management system.

At runtime, the glyph management system receives an input selecting a glyph displayed in a user interface, e.g., via selection via cursor control device, gesture, spoken utterance, and so on. In response, a Unicode identifier of the glyph is detected by the glyph management system. Glyph metadata describing a glyph cluster that includes the Unicode identifier is obtained from the cache maintained in the storage device that was preprocessed as described above. Thus, the glyph metadata for the glyph cluster includes Unicode identifiers of glyphs assigned to that cluster for the base font.

From this, the glyph management system obtains glyphs from the query font corresponding to the all the glyphs selected above using the Unicode identifiers. A representative glyph is computed by the glyph management system from these glyphs that correspond to the glyph cluster, e.g., as an average. The glyph management system then verifies the glyph cluster formed from the query font by comparing the original glyph selected from the query font to the glyph representation using a similarity threshold. If the glyph has a similarity distance with respect to the glyph representation that is within an amount defined by a similarity threshold, then the glyph is verified as being sufficiently visually similar to the glyph cluster. If the verification fails, this process is repeated individually for each of the glyphs from the query font to form a set of glyphs that are visually similar to the glyph, e.g., using the above similarity threshold. Thus, this determination and subsequent processing is not performed unless the glyphs obtained from the query font based on the Unicode IDs from the base font are not visually similar, thus conserving computational resources and supporting real time operation by a computing device.

For these glyphs (whether obtained from the glyph cluster when sufficiently similar or for other glyphs), an amount of similarity (e.g., similarity distance) is determined for the input glyph with respect to the plurality of glyphs, respectively. These amounts are then used to order the plurality of glyphs to control output of representations of the glyphs in the user interface, e.g., as a predefined number of representations, as an ordered list, and so on. The representations are user selectable via the user interface to replace the glyph with corresponding glyphs depicted using the representations. In this way, use of a base font as part of preprocessing and caching supports real time operation across types of fonts in real time, even in instances of first impression with those fonts and thus are applicable to a wide range of fonts as these fonts are developed. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ glyph accessibility techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a digital content processing system 104. The digital content processing system 104 is implemented at least partially in hardware of the computing device 102 to create, process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Example of digital content 106 include webpages, digital documents, user interfaces as output through execution of an application, and so forth. Although illustrated as implemented locally at the computing device 102, functionality of the digital content processing system 104 is also configurable as whole or part via functionality available via the network 114, such as part of a web service or "in the cloud."

An example of functionality incorporated by the digital content processing system 104 to process the digital content 106 is illustrated as a glyph management system 116. Scripts 118 correspond to collections of letters, numbers, and symbols, e.g., Latin, Greek, and so on. Accordingly, scripts 118 include a multitude of fonts 120, which is a set of the letters, numbers, and symbols of the script in a particular style and size. Glyphs are elemental symbols with respective fonts 120 corresponding to individual instances of the letters, numbers, and symbols in the particular style and size for the font. The glyphs are identifiable using a respective Unicode identifier (ID) 122, i.e., Unicode value. Unicode is a standard used to promote consistent encoding, representation, and management of the letters, numbers, and symbols of glyphs across different types of fonts 120. Glyph identifiers (ID) 124 are used to identifying different glyphs corresponding to a same Unicode ID 122, e.g., a base glyph and alternative glyphs.

Figure 11:
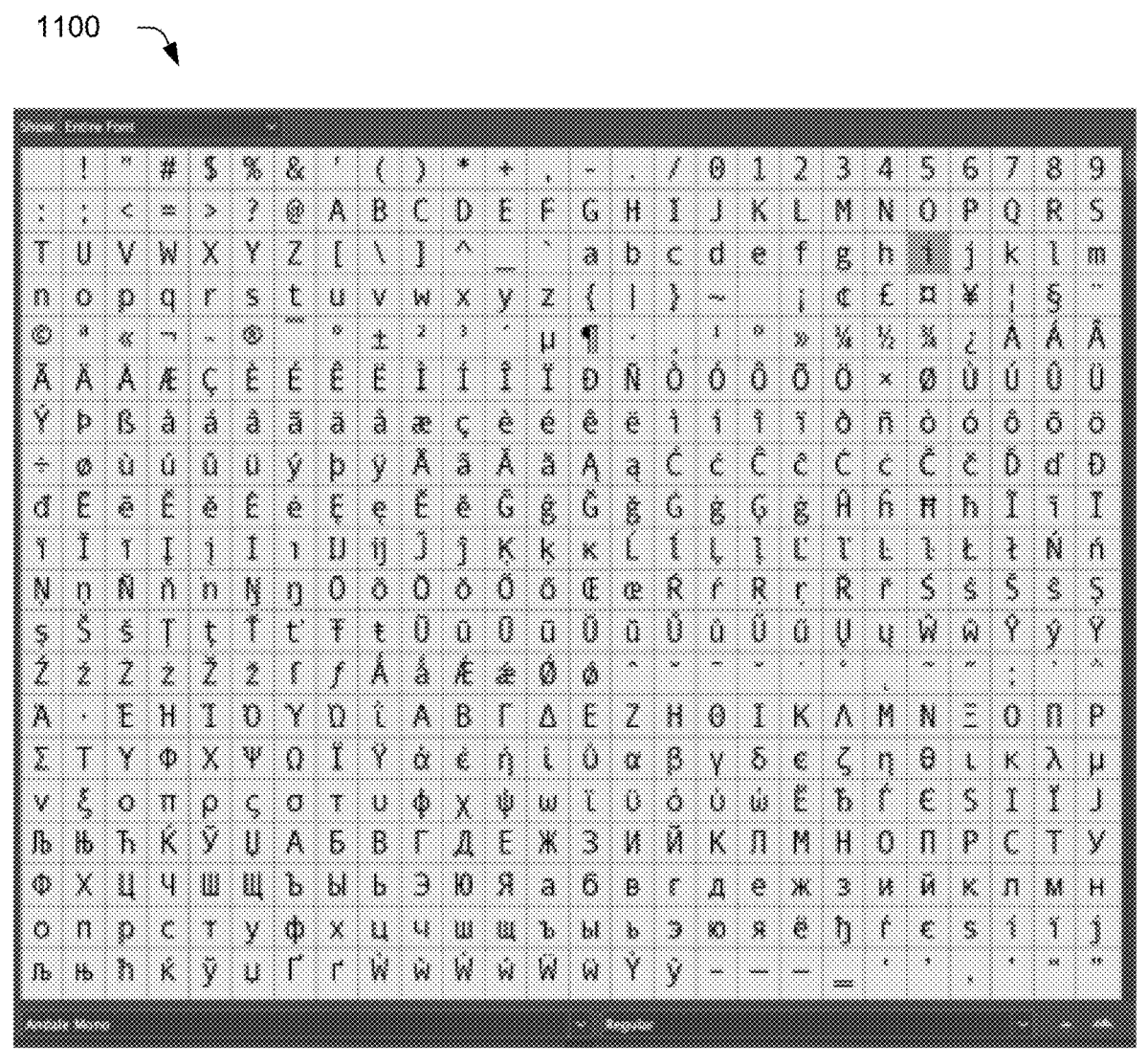

As previously described, extended character sets made available by font formats such as OpenType have made it possible to include thousands of alternative glyphs for a single font. However, conventional techniques to locate these alternative glyphs are challenging and prone to error. As illustrated in an example implementation 1100 of FIG. 11, for instance, a partial list of glyphs available for a single font is shown. This partial list includes a base glyph (e.g., "A,") as well as alternatives to these glyphs, e.g., "Á," "À," "Â," "Ã," "Ä," "Å," "Æ," and so on. As illustrated the base glyph and the alternative glyphs are spread out and scattered in the user interface. Further, different glyphs that are visually similar in some instances use different Unicode IDs 122. As such, manual determination on the part of a user as to which alternative glyphs are available, which of these are visually similar, and how to access to these glyphs is difficult and inefficient as implemented using conventional techniques.

Accordingly, the glyph management system 116 is implemented by the digital content processing system 104 to support efficient user access to alternative glyphs. As shown in the illustrated user interface 110, a glyph 126 of a capital "A" is selected. In response, the glyph management system 116 determines which glyphs correspond to the selected glyph 126 (e.g., are visually similar) from a corresponding font and outputs these glyphs in a menu 128, which are user selectable to replace the selected glyph 126. The glyph management system 116 is configured to locate these visually similar glyphs even for glyphs having different Unicode identifiers.

Further, these techniques are configured to improve operational efficiency and computational resource consumption by leveraging a similarity determination of which glyphs are visually similar using a base font that is then employed to locate corresponding similar glyphs in a query font, i.e., the font corresponding to the selected glyph that is a subject of the query. As a result, the glyph management system 116 improves operational and user efficiency in interacting with thousands of alternative glyphs for thousands of different fonts for a variety of different scripts. Further discussion of operation of the glyph management system 116 including preprocessing and runtime is included in respective sections in the following discussion and shown using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Glyph Accessibility Preprocessing Techniques

Figure 2:
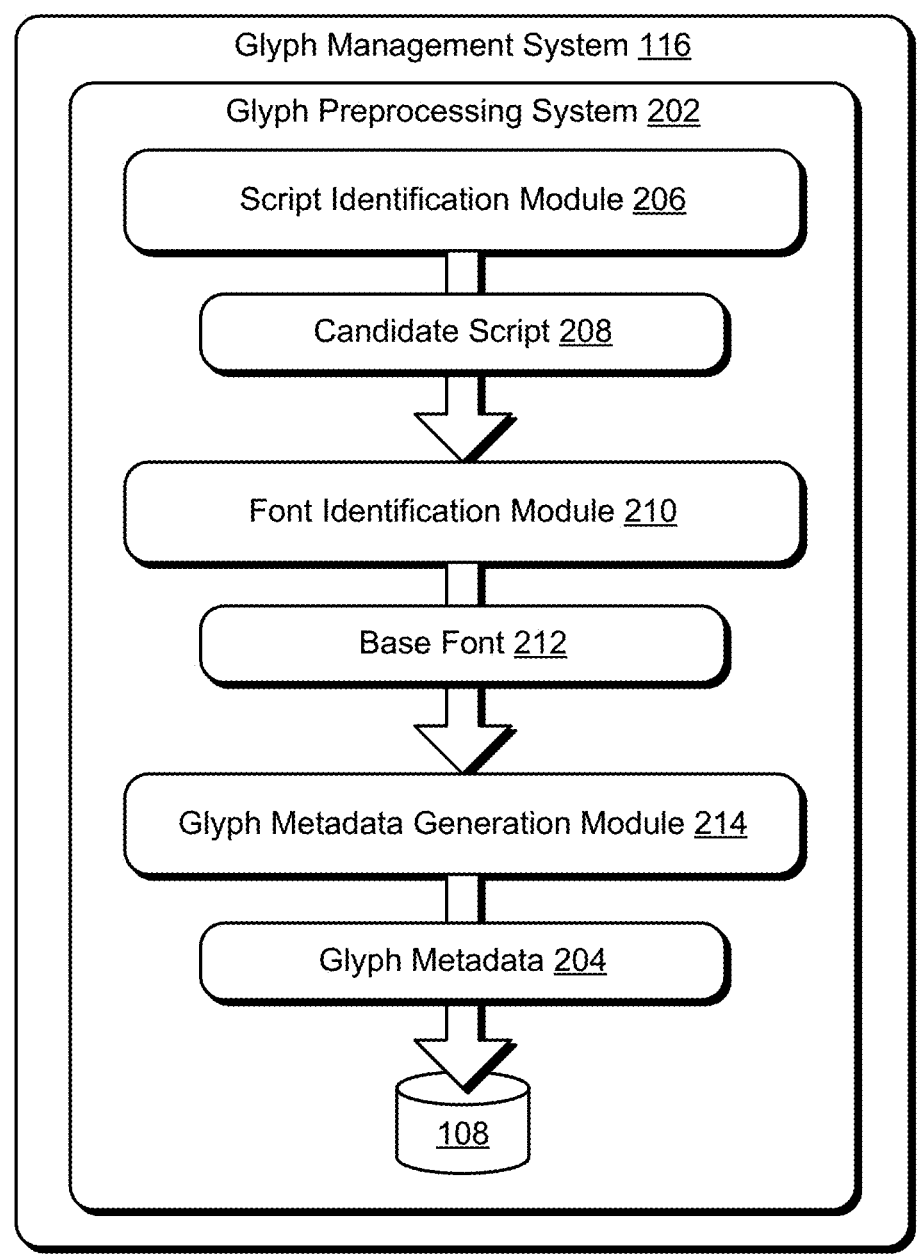
FIG. 2 depicts an example system of a glyph management system of FIG. 1 as including a glyph preprocessing system for generating glyph metadata for a base font of a script.
Figure 3:
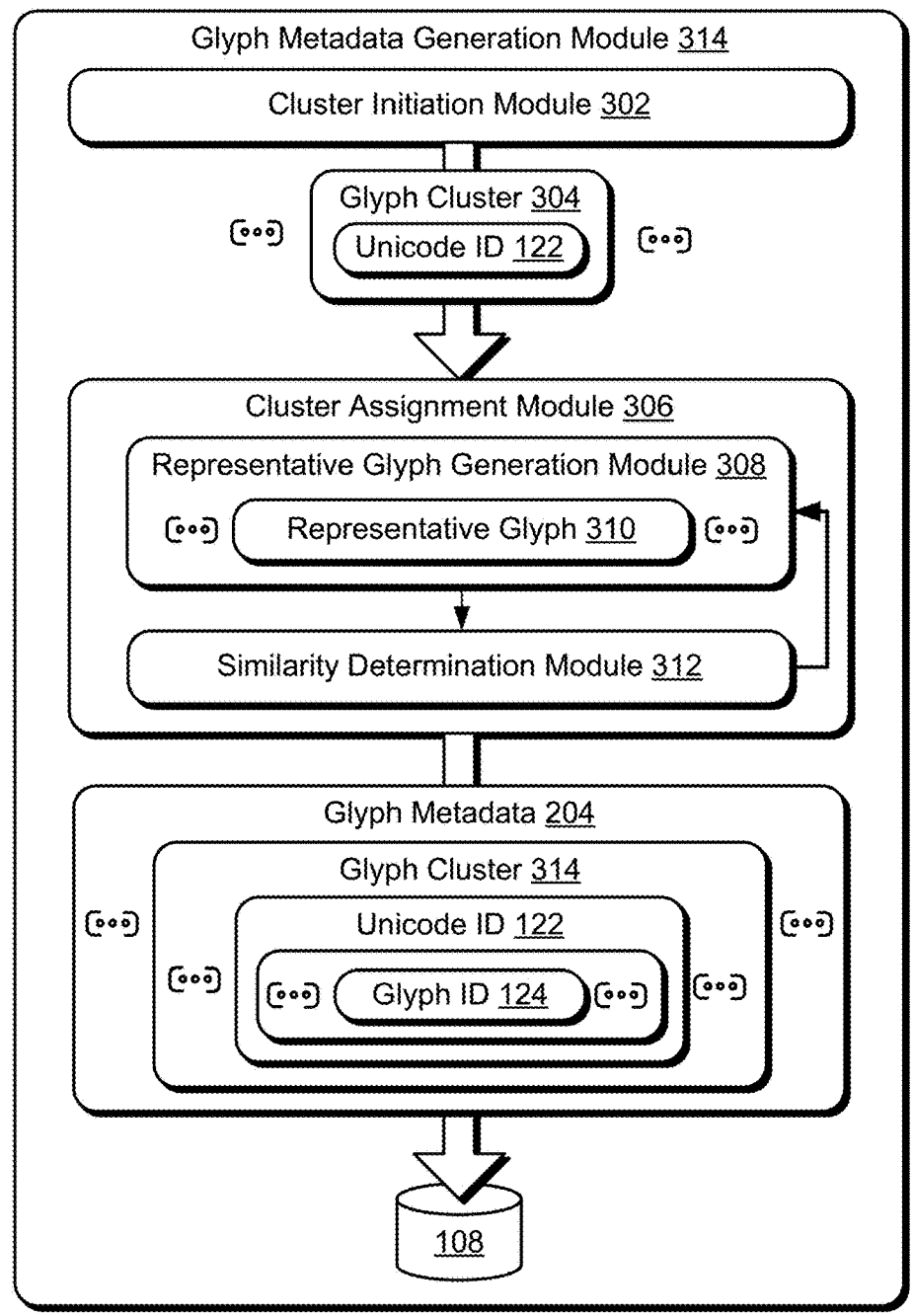
FIG. 3 depicts an example system showing operation of a glyph metadata generation module of the glyph processing system of FIG. 2 in greater detail.
Figure 4:
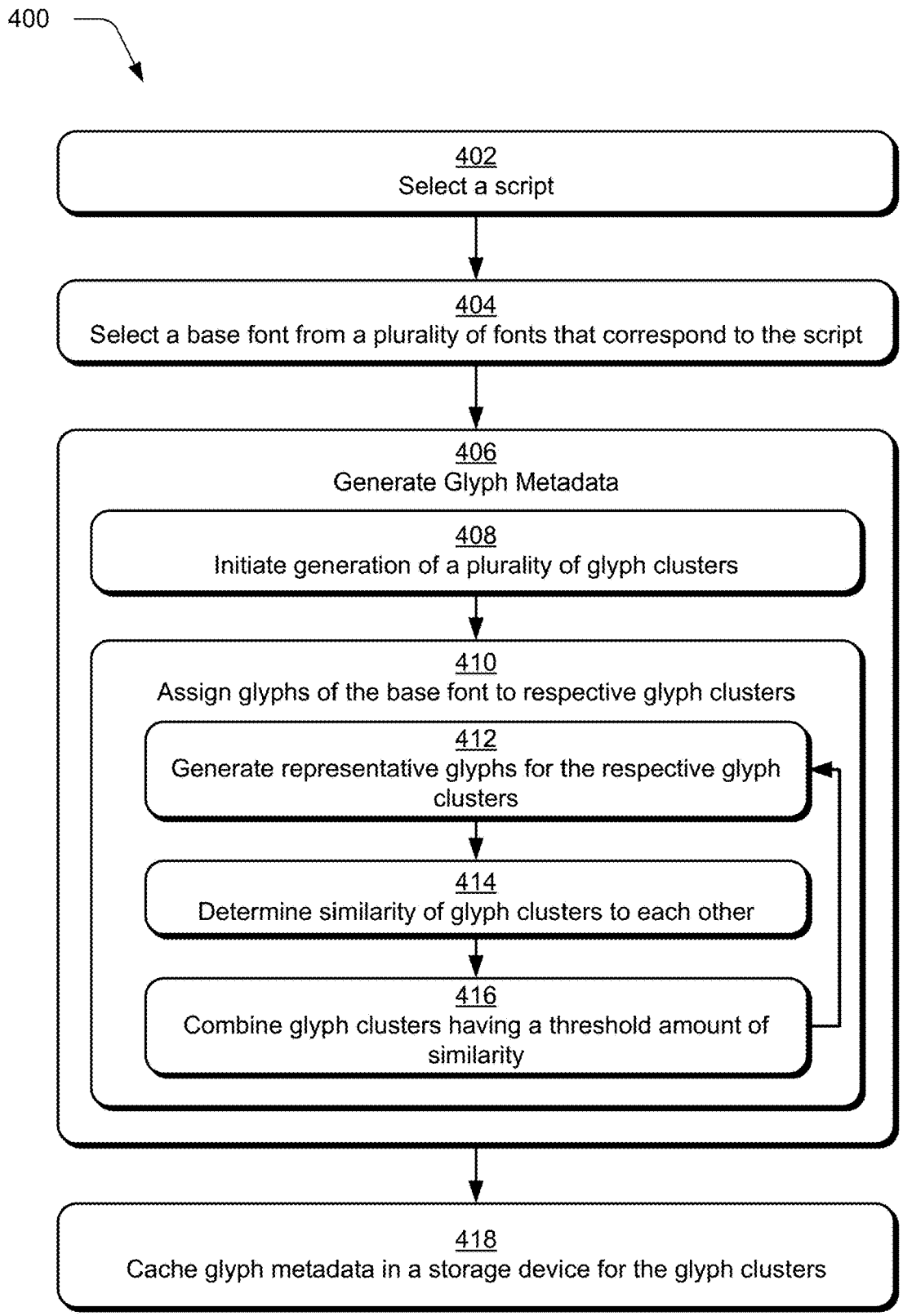
FIG. 4 is a flow diagram depicting a procedure in an example implementation of glyph metadata generation.
Figure 5:
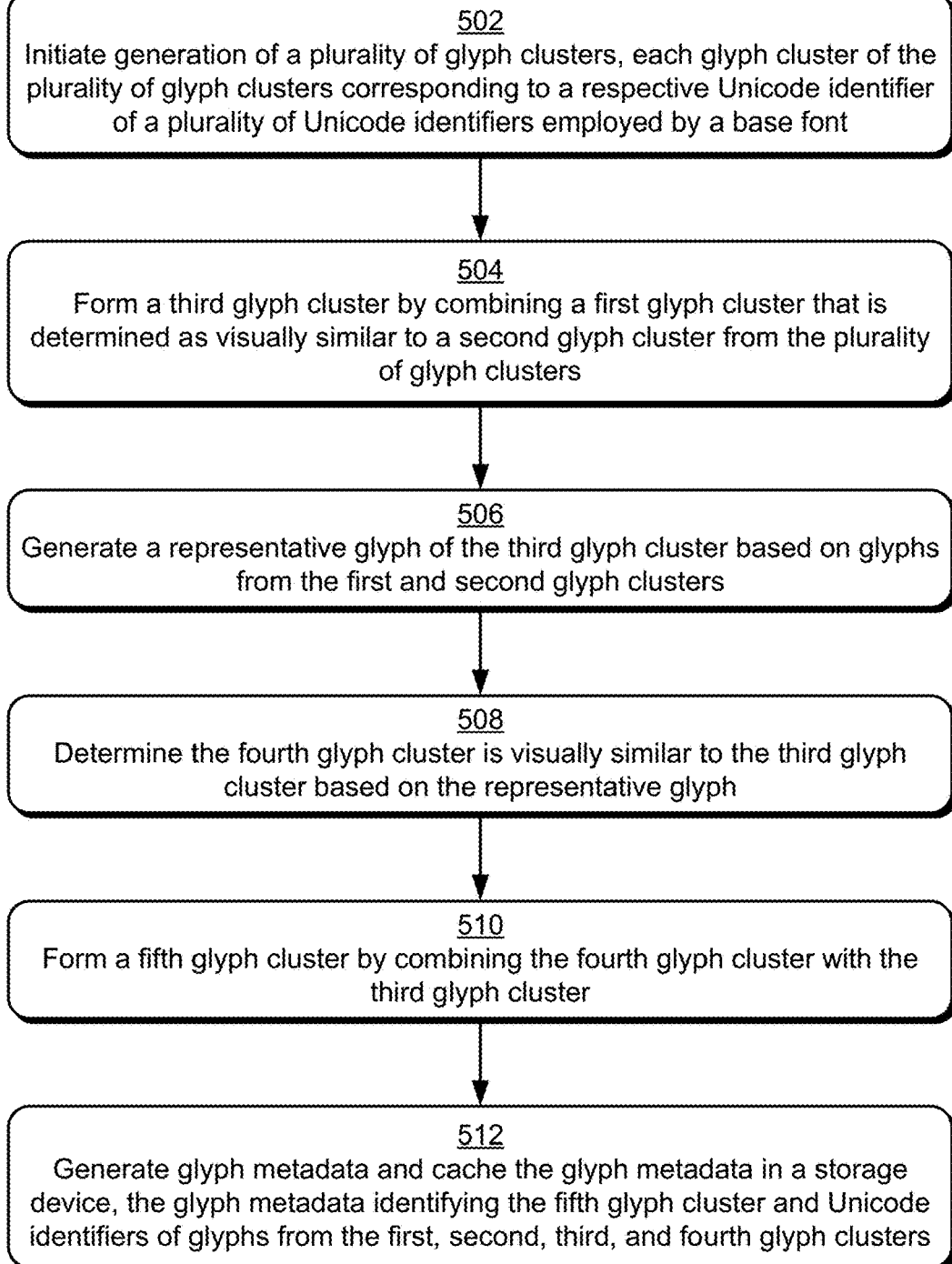
FIG. 5 is a flow diagram depicting a procedure in an example implementation of glyph clustering as part of preprocessing glyph metadata.

FIG. 2 depicts an example system 200 of the glyph management system 116 of FIG. 1 as including a glyph preprocessing system for generating glyph metadata for a base font of a script. FIG. 3 depicts an example system 300 showing operation of a glyph metadata generation module of the glyph processing system in greater detail. FIG. 4 depicts a procedure 400 in an example implementation of glyph metadata generation. FIG. 5 depicts a procedure 500 in an example implementation of glyph clustering as part of preprocessing glyph metadata.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

The glyph management system 116 includes a glyph preprocessing system 202 that is configured to generate glyph metadata 204 to be cached in a storage device 108 for use at runtime. This supports real time operation during runtime and conserves computational resources of the computing device 102 by being performed "offline." To begin, a script identification module 206 selects a candidate script 208 (block 402) from a plurality of scripts 118. In one instance, this is performed automatically and without user intervention by the script identification module 206 by identifying which scripts are maintained and/or supported locally by the computing device 102, e.g., in a storage device 108. In another instance, a user input is received via the user interface 110 to select the candidate script 208, e.g., from a plurality of options displayed in the user interface 110.

A font identification module 210 is then employed to select a base font 212 from a plurality of fonts 120 that correspond to the candidate script 208 (block 404). As before, this is performable in a variety of ways. In one example, the font identification module 210 selects the base font 212 by examining fonts 120 that are accessible locally at the computing device 102. The candidate font 212 is selected from the plurality of fonts 120 by the font identification module 210 that has a highest number (i.e., maximum number) of instances of Unicode identifiers 122. This promotes processing of a maximum number of distinct glyphs as the base font 212. Other examples are also contemplated, such as to receive a user input specifying the base font 212 from the plurality of fonts 120.

Glyph metadata 204 is then generated (block 406) by a glyph metadata generation module 214 for the base font 212, an example of which is depicted in greater detail with respect to FIG. 3. In this example, a cluster initiation module 314 initiates generation of a plurality of glyph clusters 304 (block 408). The cluster initiation module 302, for instance, assigns base glyphs having distinct Unicode IDs 122 of the base font 212 to form respective glyph clusters 304, e.g., from a priority queue to respective clusters.

Additional glyphs of the Unicode IDs 122 from the base font 212 are also assigned from the priority queue to respective glyph clusters (block 410) by the cluster initiation module 302. Alternatives of those glyphs (e.g., having the same Unicode IDs 122 but different Glyph IDs 124), for instance, are added to respective glyph clusters 304 by the cluster initiation module 302 to arrive at an initial set of glyph clusters 304 having one or more glyphs with a same Unicode ID 124. Thus, at this point each of the initial glyph clusters 304 corresponds to a single respective Unicode ID 122, but may have multiple glyph IDs 124 of alternative glyphs.

A cluster assignment module 306 is then employed by the glyph metadata generation module 314 to combine visually similar glyph clusters. In the illustrated example, a representative glyph generation module 308 is implemented to generate a representative glyph 310 (block 412), e.g., for those glyph clusters 304 that have been assigned more than one glyph. The representative glyph 310 is formed as an average of the glyphs assigned to the respective glyph cluster 304, e.g., from respective vector representations. In instances in which a single glyph is assigned to the glyph cluster, that glyph is the representative glyph.

A similarity determination module 312 is then employed to determine an amount of similarity of the glyph clusters 304 to each other (block 414). This determination is based on the representative glyphs 310, whether "generated" as an average of multiple glyphs or for "stand alone" glyphs as described above. The similarity determination module 312 is then configured to determine visual similarity of the representative glyphs to each other. A variety of techniques are usable by the similarity determination module 312 to do so, examples of which include a comparison of vector representations of the glyphs, cosine similarity, earth mover's distance similarity, kernel density estimation, and so forth.

Glyph clusters 304 are then combined that have at least a threshold amount of similarity (block 416) to each other. This is based on a similarity threshold that specifies a similarity distance defining which glyphs are considered to be visually similar and which are not. This process continues over a number of iterations. This includes generation of representative glyphs 310 for those glyph clusters that have been combined and subsequent similarity determinations until the glyph clusters 314 are formed that are visually similar as defined by the similarity threshold.

From this, glyph metadata 204 is generated and cached in a storage device 108 that describes the glyph clusters 314 (block 418). The glyph metadata 204, for instance, is arranged accordingly to glyph cluster 314 and has Unicode IDs 122 of glyphs from the base font 212 that have been assigned to that cluster as visually similar to each other. Thus, the glyph cluster 314, in some instances, references base glyphs for visually similar Unicode IDs 122 and glyph IDs 124 of alternative glyphs as well. This process is repeated for other scripts 118 such that each script includes glyph metadata 204 for a corresponding base font 212. Thus, each script 118 is used to generate glyph metadata 204 for a single respective base font 212 thereby conserving memory resources of the computing device 102 as this is not performed for each font 120 available at the computing device 102.

In the example procedure 500 of FIG. 5, for instance, generation of a plurality of glyph clusters is initiated in which each glyph cluster of the plurality of glyph clusters 304 corresponds to a respective Unicode identifier of a plurality of Unicode identifiers 122 employed by a base font 212 (block 502). A third glyph cluster is formed by combing a first glyph cluster that is determined as visually similar to a second glyph cluster from the plurality of glyph clusters (block 504), e.g., using a similarity threshold as described above. A representative glyph of the third glyph cluster is generated based on glyphs from the first and second glyph clusters (block 506) as an average of those glyphs.

A determination is then made at a subsequent iteration that a fourth glyph cluster is visually similar to the third glyph cluster based on the representative glyph (block 508) generated for the third glyph cluster. In response to this determination, a fifth glyph cluster is formed by combining the fourth glyph cluster with the third glyph cluster (block 510) and more particularly glyphs that make up those clusters.

Glyph metadata 204 is generated and cached in a storage device 108 that identifies the fifth glyph cluster and Unicode identifiers of glyphs from the first and second glyph clusters (which together form the third glyph cluster) as well as glyphs from the fourth glyph cluster (block 512). In this way, use of the representative glyphs 310 conserves consumption of computational resources by permitting a single determination of similarity, as opposed to determining similarity between each of the glyphs of the base font 212 to each other, which is computationally prohibitive when confronted with the thousands of glyphs that may be available even for a single font. The glyph metadata 204 is maintained in a storage device and accessed during runtime as further described in the following section.

Glyph Accessibility Runtime Techniques

Figure 6:
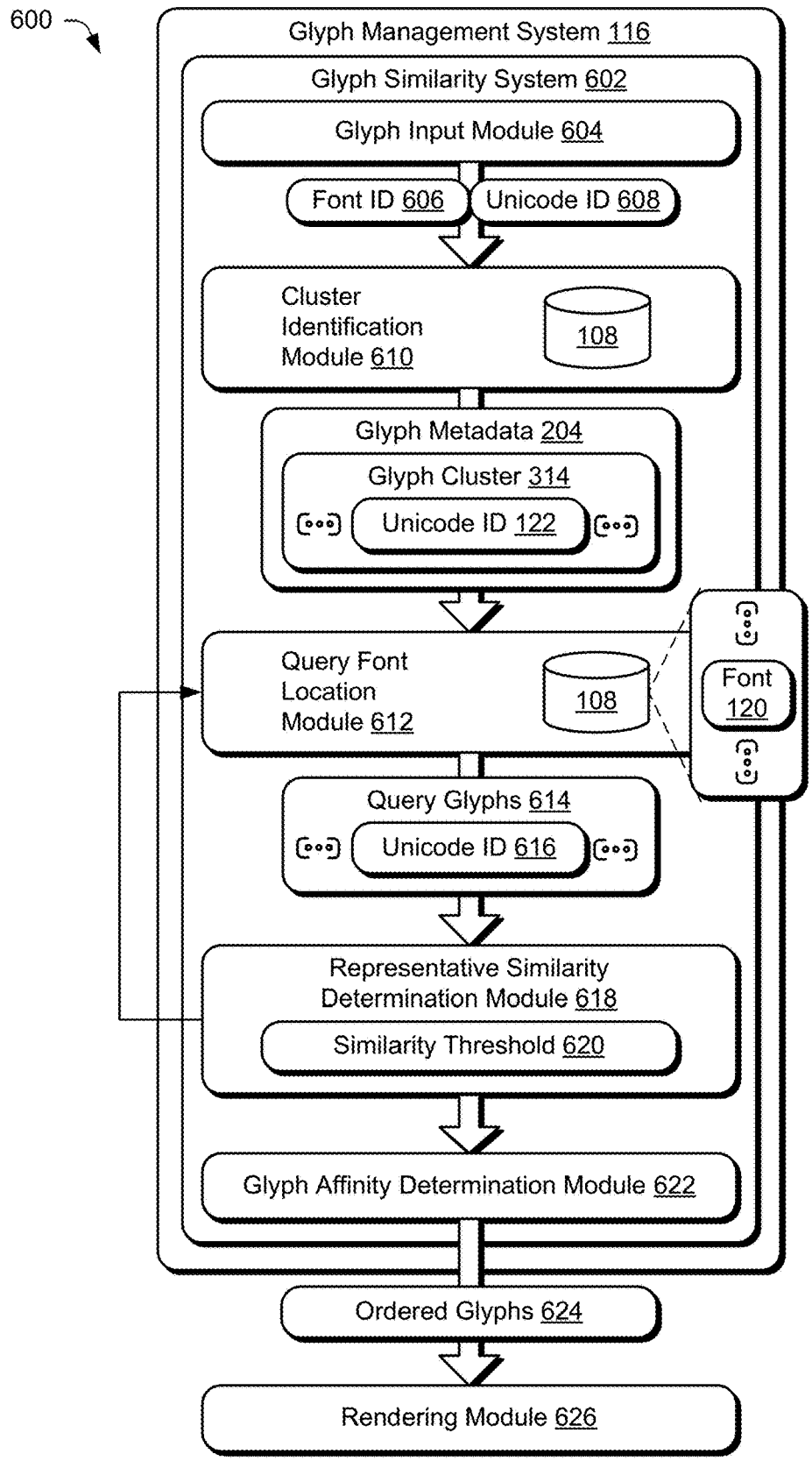
FIG. 6 depicts an example system of the glyph management system of FIG. 1 as including a glyph similarity system to determine and output similar glyphs at runtime by leveraging cached glyph metadata.
Figure 7:
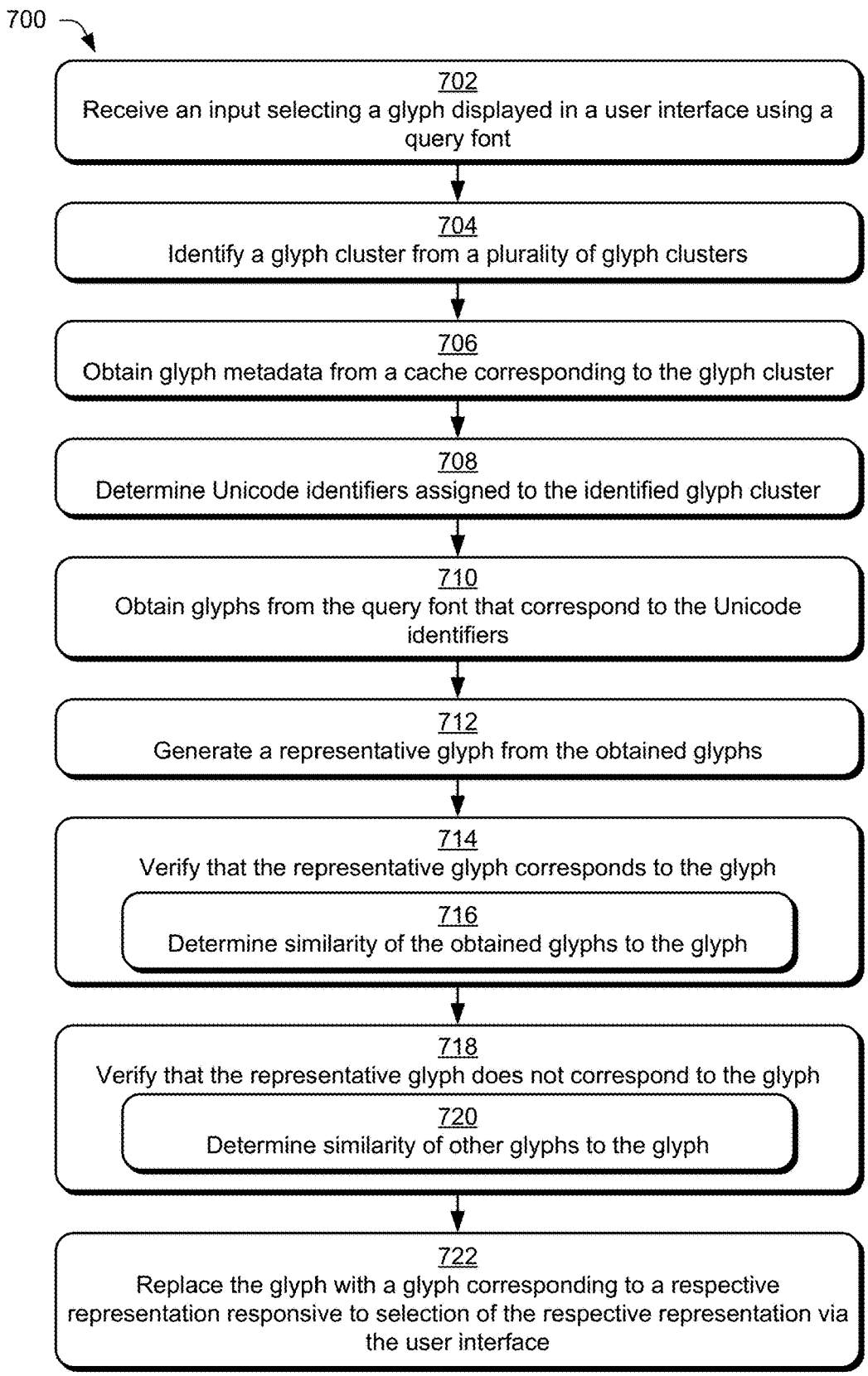
FIG. 7 is a flow diagram depicting a procedure in an example implementation of glyph similarity determination, output, and replacement in real time.
Figure 8:
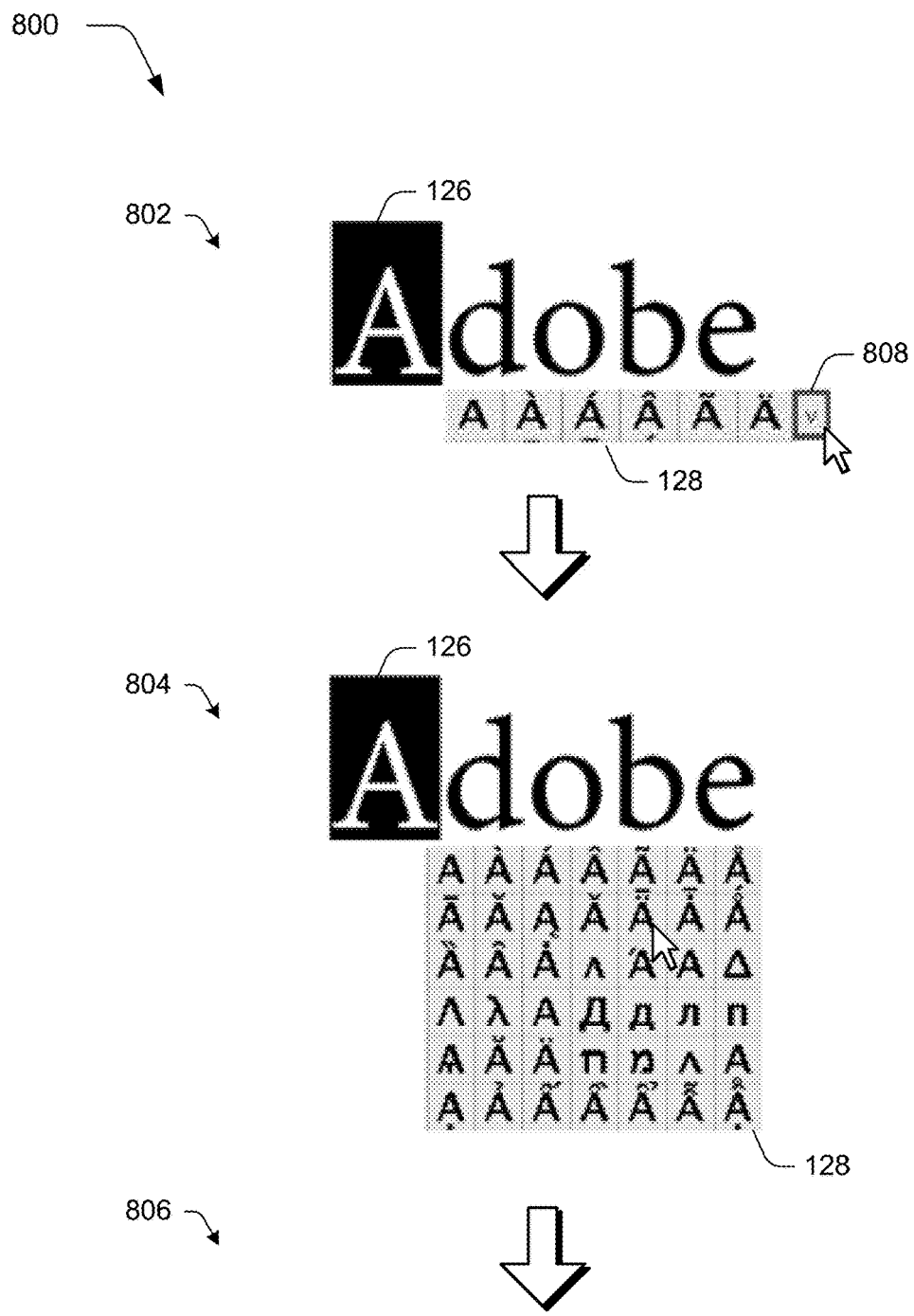
FIG. 8 depicts an example implementation of output and replacement of similar glyphs in a user interface.
Figure 9:
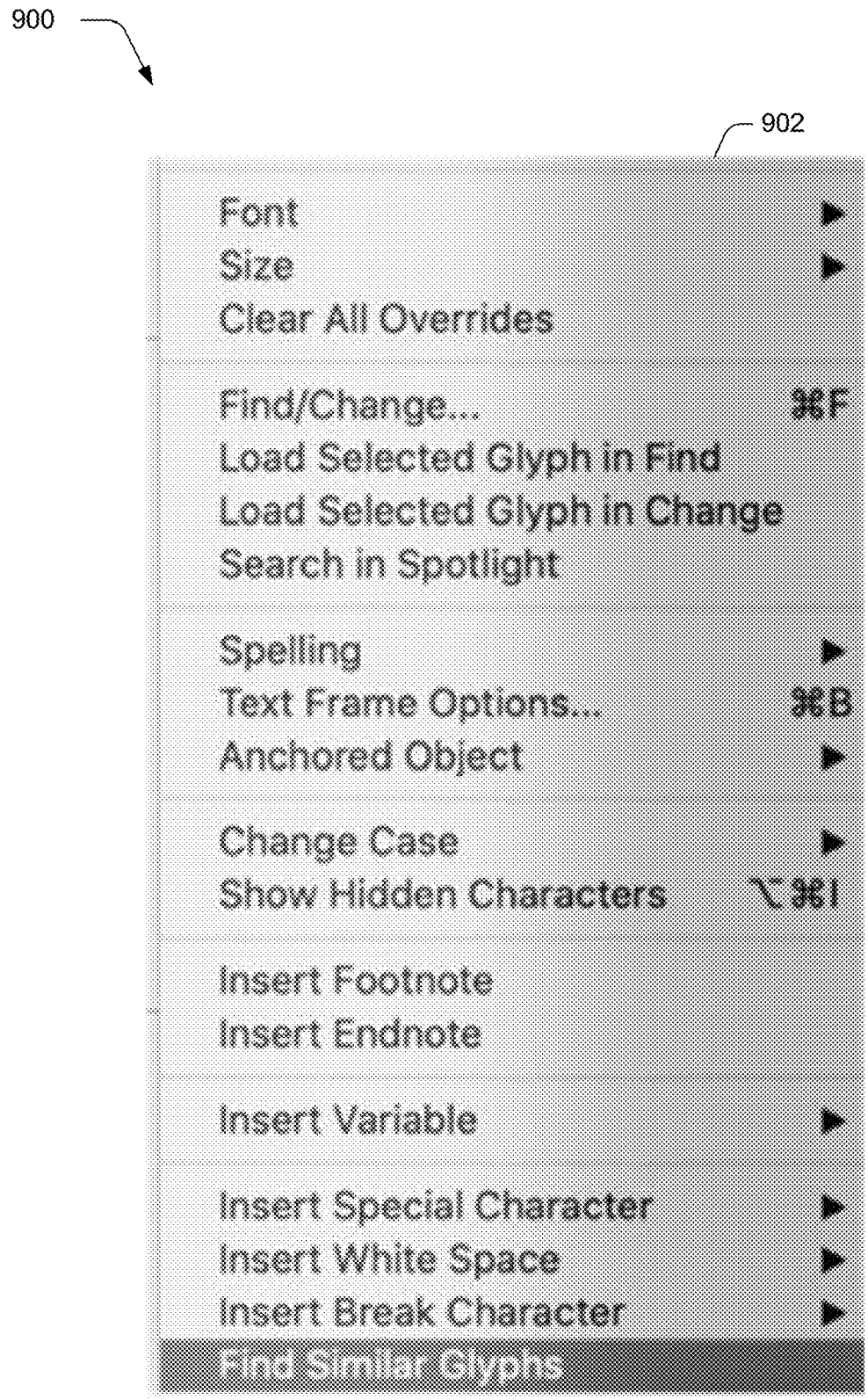
FIG. 9 depicts an example implementation of a menu in a user interface that is configured to initiate an operation to locate similar glyphs.
Figure 10:
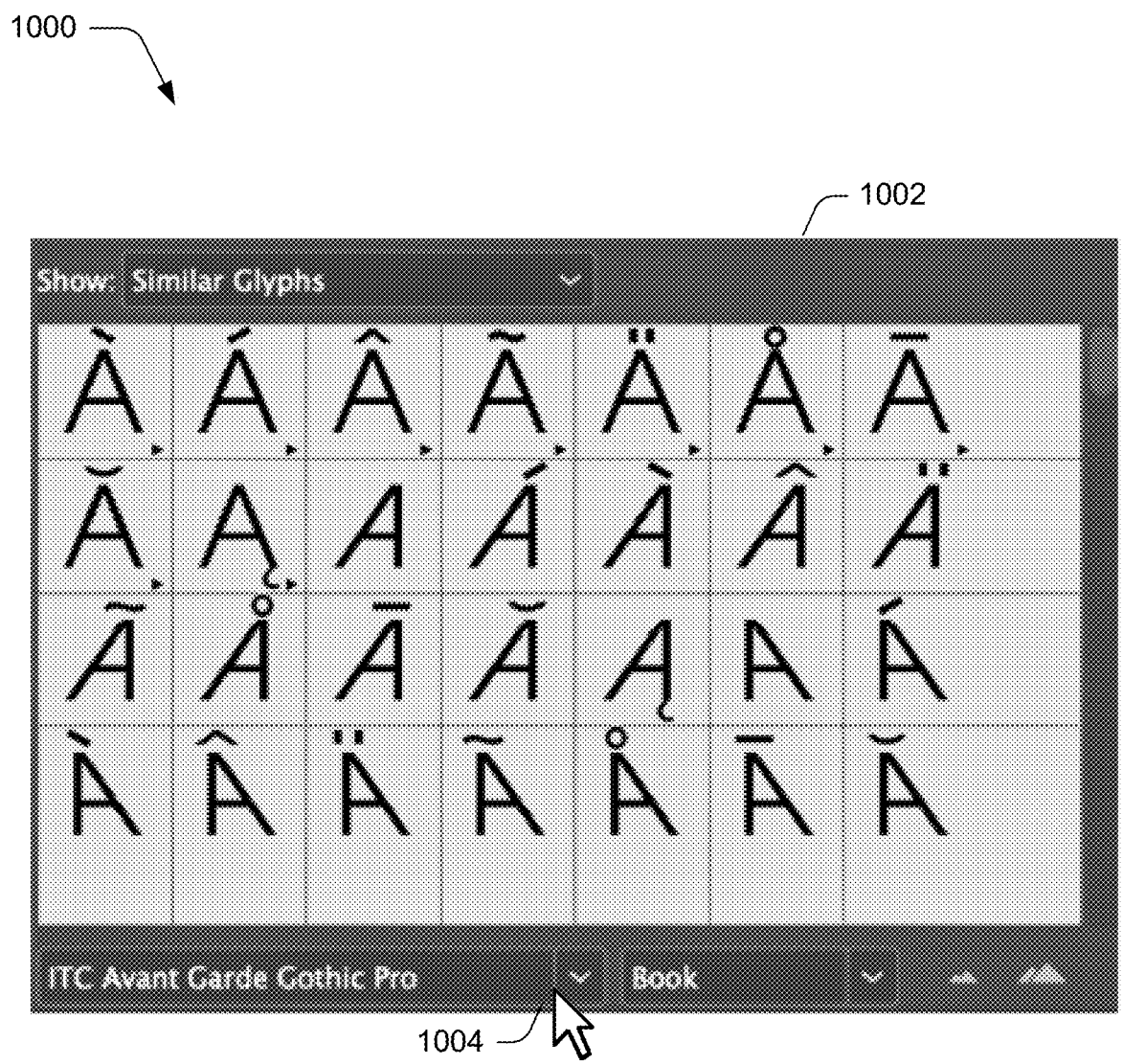
FIG. 10 depicts an example implementation of an option in a user interface that is output responsive to selection of an input glyph to view similar glyphs in a different font.

FIG. 6 depicts an example system 600 of the glyph management system 116 of FIG. 1 as including a glyph similarity system 602 to determine and output similar glyphs at runtime by leveraging cached glyph metadata. FIG. 7 depicts a procedure 700 in an example implementation of glyph similarity determination, output, and replacement in real time. FIG. 8 depicts an example implementation 800 of output and replacement of similar glyphs in a user interface 110. FIG. 9 depicts an example implementation 900 of a menu in a user interface 110 that is configured to initiate an operation to find similar glyphs. FIG. 10 depicts an example implementation 1000 of an option in a user interface 110 that is output responsive to selection of an input glyph to view similar glyphs in a different font.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 6-10.

An input is received in this example by a glyph input module 604 that selects a glyph displayed in a user interface 110 using a query font (block 702). As shown in FIG. 1, for instance, a cursor control device, gesture, spoken utterance, and so on is used to select a glyph 126. Based on this selection, the glyph input module 604 detects a font ID 606 of a corresponding font, in which, the glyph is included (also referred to as the "query font") as well as a Unicode ID 608 of the glyph 126.

The Unicode ID 608 is then passed as an input to a cluster identification module 610. The cluster identification module 610 is configured to identify a glyph cluster 314 (block 704) that corresponds to the Unicode ID 608 from glyph metadata 204 maintained in a cache in a storage device 108. The glyph cluster 314, for instance, includes Unicode IDs 608 that have been determined as visually similar for the base font 212 as described in the previous section. Therefore, the Unicode ID 608 of the selected glyph 126 is used to locate a glyph cluster 314 having that Unicode ID. Glyph metadata 204 that corresponds to the glyph cluster 314 is then obtained from the cache (block 706) and the cluster identification module 610 determines which Unicode identifiers, if any, are also assigned to the glyph cluster (block 708). Thus, the glyph cluster 314 is used to locate additional Unicode identifiers that have been determined as having glyphs that are visually similar through preprocessing of the base font 212 as described in the previous section.

The Unicode IDs 122 of the glyph cluster 314 identified from the glyph metadata 204 are then passed as an input to a query font location module 612. The query font location module 612 first locates a font 120 corresponding to the font ID 606 of the query font, i.e., the font 120 used to render the selected glyph. The query font location module 612 then obtains query glyphs 614 from the located font 120 having Unicode IDs 616 identified from the glyph metadata 204 (block 710), e.g., as maintained in a storage device 108 of the computing device 102.

A representation similarity determination module 618 is then utilized by the glyph similarity system 602 to generate a representative glyph from the query glyphs 614 (block 712), e.g., through use of techniques described in relation to the representative glyph generation module 308 with respect to FIG. 4. This is performed, for instance, as an average of vector representations of the query glyphs 614. The representative similarity determination module 618 then verifies whether the representative glyph is visually similar to the selected glyph input by the glyph input module 604 based on a similarity threshold 620, e.g., has a similarity distance less than the similarity threshold 620.

In an instance in which the representative glyph is verified as corresponding to the glyph (block 714) the representative similarity determination module 618 is implemented to determine amounts of similarity of the obtained glyphs to the glyph (block 716), respectively. Thus, in this instance the amount of similarity is determined for each of the query glyphs 614 with respect to the input glyph responsive to successful verification.

In another instance in which the representative glyph is not verified by the representative similarity determination module 618 as corresponding to the glyph (block 718), the query font location module 612 obtains each of the glyphs that correspond to the font 120 and more particularly the font ID 606. The representative similarity determination module 618 then determines similarity of each of these query glyphs 614 to the selected glyph 126 (block 720) and from this selects a subset as being similar to the input glyph. The subset, for instance, includes a predefined number of the glyphs based on similarity in a ranked order, have at least a threshold amount of similarity, and so on.

In this way, the glyph management system 116 conserves computational resources of the computing device 102 by first determining whether the query glyphs 614 for the glyph cluster 314 are visually similar. If so, respective amounts of similarity (e.g., similarity distance) to those query glyphs 614 is determined and if not, respective amounts of similarity are determined for each of the glyphs 614 of the font 120.

The glyphs from the query font 120 that have been determined as visually similar to the selected glyph are then passed to a glyph affinity determination module 622. The glyph affinity determination module 622 is configured to generate ordered glyphs 624 based on respective amounts of visual similarity to the selected glyph 126. The ordered glyphs 624 are then passed as an input in this example to a rendering module 626 for rendering in a user interface 110.

FIG. 8 depicts an example of glyph selection, accessibility of similar glyphs, and glyph replacement using first, second, and third stages 802, 804, 806. At the first stage 802, a glyph 126 is selected that is to be used as a basis to locate visually similar glyphs. In response, a menu 128 is output include initial options for replacement of the glyph 126, which includes a predefined number (e.g., top six) of representations of glyphs from the ordered glyphs 624. The menu 128 includes an option 808 that is user selectable to expand the menu 128 as shown at the second stage 804 to display additional representations.

A user input is received via user interaction with the menu 128 in the user interface 110 to select a replacement glyph via a respective representation. In response, the selected glyph 126 is replaced with the replacement glyph corresponding to the respective representation responsive (block 722). Other techniques are also usable to initiate this process, such as a context menu 902 that is output via a "right click" of a cursor control device as shown in an example implementation 900 of FIG. 9.

FIG. 10 illustrates another example implementation 1000 of a menu 1002 which includes support for changing the query font. In this example, visually similar fonts are output in a query font that matches the font of the selected glyph 126. An option 1004 is included to change the query font to a different font, which causes computation of visual similarity and output of those glyphs in the user interface 110 in real time. In this way, the techniques and system described herein improve computational and user efficiency in glyph accessibility over conventional techniques and as such improve operation of the underlying computing device 102.

Example System and Device

Figure 12:
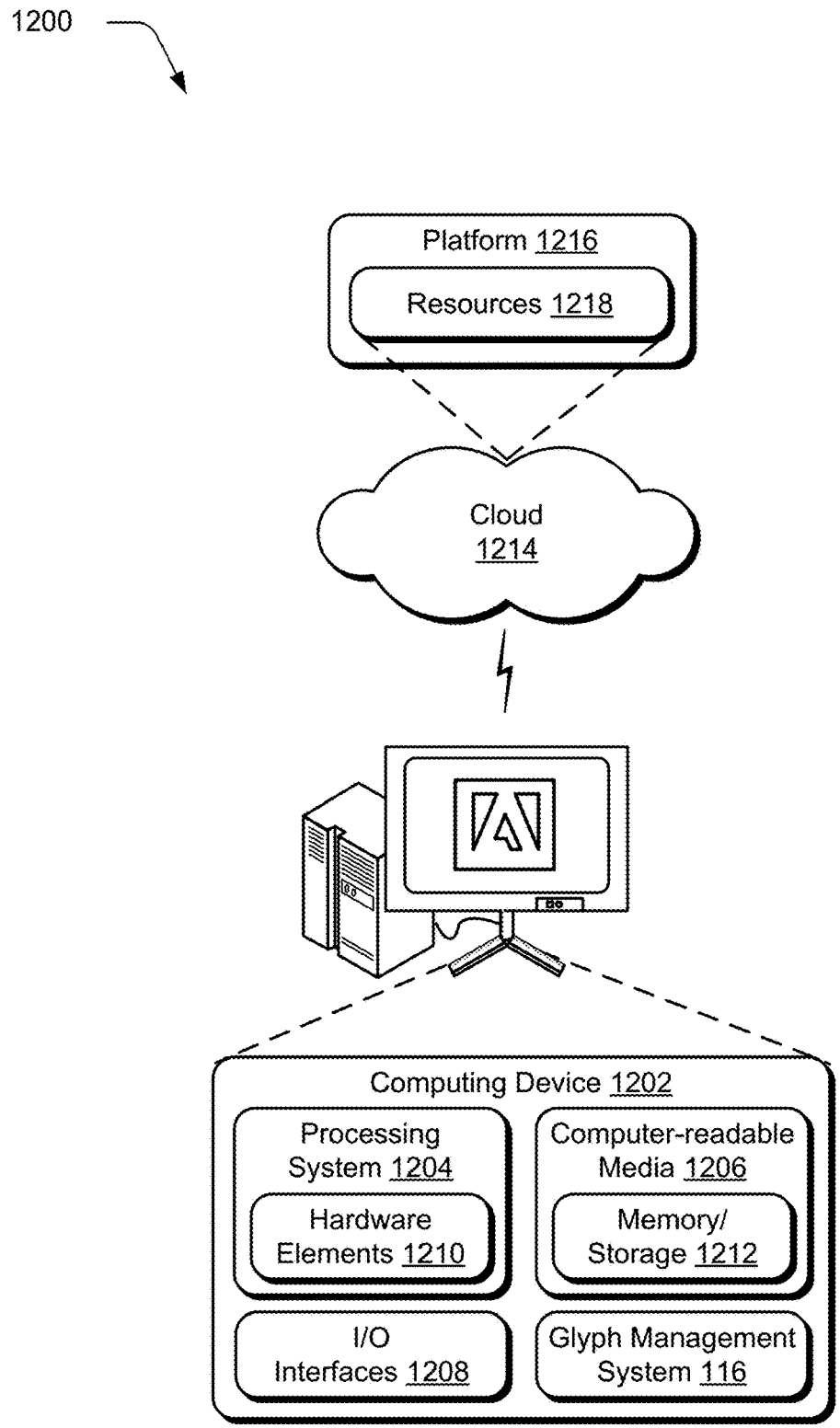
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the glyph management system 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium glyph environment, a method implemented by a computing device, the method comprising:
   receiving, by the computing device, an input selecting a glyph displayed in a user interface using a query font;
   identifying, by the computing device, a glyph cluster from a plurality of glyph clusters as corresponding to the glyph, the plurality of glyph clusters formed using a base font;
   determining, by the computing device, Unicode identifiers assigned to the identified glyph cluster from the base font;
   obtaining, by the computing device, glyphs from the query font that correspond to the Unicode identifiers;
   generating, by the computing device, a representative glyph from the obtained glyphs from the query font;
   responsive to a result of verifying by the computing device that the representative glyph corresponds to the glyph, determining an amount of similarity, respectively, of the glyph to the obtained glyphs from the query font; and
   displaying, by the computing device, representations of at least a portion of the obtained glyphs in the user interface based on the determined amount of similarity.

2. The method as described in claim 1, wherein the identifying the glyph cluster includes locating the glyph cluster from the plurality of glyph clusters based on a Unicode identifier associated with the glyph.

3. The method as described in claim 1, wherein the plurality of glyph clusters are maintained in a cache after preprocessing of the base font.

4. The method as described in claim 1, wherein the verifying includes determining the glyph is similar to the representative glyph based on visual similarity.

5. The method as described in claim 4, wherein the visual similarity is defined using a similarity threshold.

6. The method as described in claim 1, wherein the generating the representative glyph from the obtained glyphs from the query font includes generating the representative glyph as an average representation of the obtained glyphs.

7. The method as described in claim 1, wherein the query font is different than the base font.

8. The method as described in claim 1, further comprising ordering the obtained glyphs based on the amount of similarity to the glyph, respectively, and wherein the displaying is performed based at least in part on the ordering.

9. The method as described in claim 1, further comprising:
   responsive to a result of verifying that the representative glyph does not correspond to the glyph, determining an amount of similarity, respectively, of the glyph to other glyphs from the query font;
   identifying, by the computing device, another portion of the other glyphs by comparing the amount of similarity to a similarity threshold, respectively; and
   displaying, by the computing device, representations of the other portion of the other glyphs in the user interface.

10. In a digital medium glyph preprocessing environment, a system comprising:
    a font identification module implemented at least partially in hardware of a computing device to select a base font from a plurality of fonts that correspond to a script;
    a cluster initiation module implemented at least partially in hardware of the computing device to initiate generation of a plurality of glyph clusters, each glyph cluster of the plurality of glyph clusters corresponding to a respective Unicode identifier of a plurality of Unicode identifiers employed by the base font;
    a representative glyph generation module implemented at least partially in hardware of the computing device to generate representative glyphs for the respective glyph clusters; and
    a similarity determination module implemented at least partially in hardware of the computing device to assign glyphs of the base font to respective glyph clusters of the plurality of glyph clusters based on the representative glyphs.

11. The system as described in claim 10, wherein the representative glyphs are generated as an average representation of the glyphs assigned to a respective said cluster.

12. The system as described in claim 10, wherein the font identification module is configured to select the base font from the plurality of fonts that correspond to the script based on a number of distinct Unicode identifiers included in the base font.

13. The system as described in claim 10, wherein the similarity determination module is configured to combine glyph clusters based on comparison of respective said representative glyphs using a similarity threshold.

14. The system as described in claim 13, wherein the similarity threshold is defined based on cosine similarity, earth mover's distance similarity, or kernel density estimation.

15. In a digital medium glyph preprocessing environment, a method implemented by a computing device, the method comprising:
- initiating, by the computing device, generation of a plurality of glyph clusters, each glyph cluster of the plurality of glyph clusters corresponding to a respective Unicode identifier of a plurality of Unicode identifiers employed by a base font;
- forming, by the computing device, a third said glyph cluster by combining a first said glyph cluster that is determined as visually similar to a second said glyph cluster;
- generating, by the computing device, a representative glyph of the third said glyph cluster based on glyphs from the first and second said glyph clusters;
- determining, by the computing device, a fourth said glyph cluster is visually similar to the third said glyph cluster based on the representative glyph;
- forming, by the computing device, a fifth said glyph cluster by combining the fourth said glyph cluster with the third said glyph cluster; and
- generating, by the computing device, glyph metadata and caching the glyph metadata in a storage device, the glyph metadata identifying the fifth said glyph cluster and Unicode identifiers of glyphs from the first, second, and fourth glyph clusters.

16. The method as described in claim 15, wherein the representative glyph is generated by averaging glyphs from the first and second said glyph clusters.

17. The method as described in claim 15, wherein the first said glyph cluster is determined as visually similar to the second said glyph cluster based on a similarity threshold.

18. The method as described in claim 17, wherein the similarity threshold is defined based on cosine similarity, earth mover's distance similarity, or kernel density estimation.

19. The method as described in claim 15, wherein the initiating is performed responsive to identifying the base font from a plurality of fonts corresponding to a single script.

20. The method as described in claim 19, wherein the identifying is performed automatically and without user intervention by the computing device based on a number of Unicode identifiers assigned to the plurality of fonts, respectively, and the base font has a maximum said number of Unicode identifiers.

* * * * *